F. E. BRIGHT.
PROCESS OF ASSEMBLING BALL BEARINGS.
APPLICATION FILED OCT. 15, 1909.
1,004,739.
Patented Oct. 3, 1911.
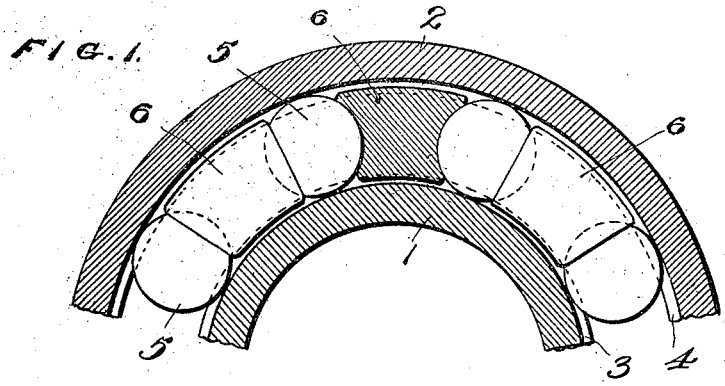
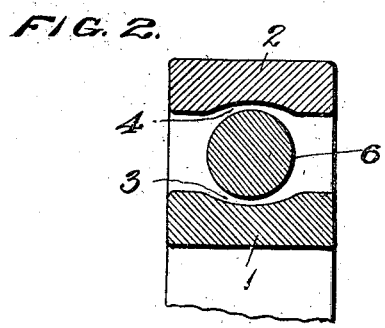
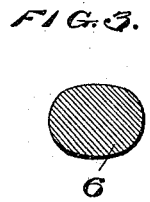
WITNESSES
INVENTOR
Fred E. Bright

UNITED STATES PATENT OFFICE.

FRED EUGENE BRIGHT, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

PROCESS OF ASSEMBLING BALL-BEARINGS.

1,004,739. Specification of Letters Patent. Patented Oct. 3, 1911.

Application filed October 15, 1909. Serial No. 522,824.

*To all whom it may concern:*

Be it known that I, FRED EUGENE BRIGHT, a citizen of the United States, and a resident of Philadelphia, in the county of Philadelphia and State of Pennsylvania, have invented a new and useful Process of Assembling Ball-Bearings, of which the following is a specification.

My invention consists in a novel process of assembling ball bearings employing separators between the balls and particularly relates to a method of inserting the separators.

In carrying out my process in connection with a bearing of the well-known annular type comprising an inner and an outer bearing ring provided with races of curved cross section, and a series of balls in the races, I provide separators of soft, malleable or ductile material of an original shape such that they may be easily inserted between the bearing rings between adjacent balls. After the separators are placed in working position they are re-formed in any convenient way so that they are prevented from displacement by engagement with a portion or portions of the bearing.

The invention will be more easily understood by explaining it in connection with a specific ball bearing in assembling which the method may be employed. The accompanying drawing shows such a bearing.

Figure 1 is a section of a fragment of a bearing in a center plane transverse the rotative axis of the bearing. Fig. 2 is a longitudinal section taken through the center of one of the separators; and Fig. 3 is a transverse section of a separator in its original form.

Reference numeral 1 designates the inner bearing ring; 2 the outer bearing ring; 3 and 4 the races of curved cross section. A suitable number of balls 5 are placed in the races in any approved manner. The particular method of inserting the balls does not form a part of this invention.

The separators 6 of soft, malleable or ductile material (such, for example, as Babbitt or bearing metal) are originally made with a flattened cross section as shown in Fig. 3, so that they may be easily passed between the adjacent edges of the bearing rings.

My process is carried out by inserting a separator in the form shown in Fig. 3, or its equivalent, between each two adjacent balls within the races and then re-forming the separator in any convenient manner so that it assumes approximately a cylindrical shape as shown in Fig. 2 and so that it extends more or less into the ball races. The reshaping of the separators may be accomplished individually or all at once by the use of dies and presses, a hammer and punch, or in any other convenient manner.

It is sometimes desirable to cup the ends of the separators to engage segments of the balls. The cups may be originally provided in the ends of all of the separators for a single bearing except one or both ends of one of the separators which is the last one inserted. Either or both ends of the last separator inserted may be reshaped in any suitable manner when in position to engage segments of the adjacent ball or balls.

A single separator may be shaped so that it either engages the balls or engages the races, or so that it engages both the balls and the races.

From the foregoing it will be apparent that broadly my invention consists in the provision of a separator in an original shape which will permit it to be readily inserted in working position in a bearing, inserting it in working position between two adjacent balls and then re-shaping it so that it resists displacement by engagement with some portion of the bearing.

I claim:

1. The process of assembling a ball bearing comprising bearing rings, balls and separators, the latter being each composed of malleable metal capable of easy deformation and of solid cross-section, consisting in originally forming the separators so that they may be readily inserted between the rings, inserting the separators in working position between the balls, and thereafter changing the form of the separators so that they are prevented from displacement from working position.

2. The process of assembling a ball bearing comprising two bearing rings having races of curved cross section, balls in the races, and separators composed of malleable material interposed between the adjacent balls, consisting in originally forming the separators with a flattened cross section so that they may be easily inserted between the bearing rings, inserting the separators in working position, and thereafter changing the form of the separators so that they engage a portion of the bearing.

3. The process of assembling a ball bearing comprising two bearing rings having races of curved cross section, balls in the races, and separators composed of malleable material interposed between the adjacent balls, consisting in originally forming the separators with a flattened cross section so that they may be easily inserted between the bearing rings, inserting the separators in working position, and thereafter changing the form of the separators to approximately round cross section so that they enter the races and are thus prevented from displacement.

FRED EUGENE BRIGHT.

Witnesses:
NETTIE L. HAHN,
MARY M'CALLA.